UNITED STATES PATENT OFFICE

ARTHUR ARENT, OF DES MOINES, IOWA, ASSIGNOR TO ARTHUR ARENT LABORATORIES, INC., OF DES MOINES, IOWA, A CORPORATION OF IOWA

ART OF PROTECTIVELY TREATING MATERIALS

No Drawing.   Application filed July 8, 1926.   Serial No. 121,265.

This invention relates to art of protectively treating materials; and more particularly it relates to the treatment of materials to render the same non-inflammable or to reduce their inflammability to any desired extent.

In U. S. Patents 1,388,824, 1,388,825, 1,388,826, 1,388,827, 1,388,828, 1,388,829, 1,418,609, 1,418,610, and 1,451,313 the present applicant has disclosed the protective treatment of materials of many kinds with substantially nonaqueous solutions of fire-retardant metal compounds, and particularly metal compounds, such an antimony salts, that are substantially water-insoluble but are hydrolyzable upon contact with water. The processes disclosed in these prior patents have proved valuable for many purposes and some of them have gone into extensive commercial use. In the protective treatment of some classes of material, however, it is important to take special precautions to avoid any deteriorating effect of acidity which may develop in some cases in connection with the employment of such solutions. The addition of ordinary inorganic neutralizing or antacid agents can in many cases be resorted to in practice for this purpose, but in other cases this is unsatisfactory for one reason or another. For example. in fireproofing articles made of celluloid or other cellulose ester material, it has been found that the precautions recommended in Patent 1,451,313, although having an advantageous effect, do not always afford complete protection against deterioration by action of the free acid derived from the antimony salt, and that as a result the flexibility of a celluloid film, for instance, treated in this manner, is often lessened in the course of time.

It is accordingly one of the principal objects of the present invention to avoid the difficulties sometimes encountered in the prior practice above outlined and to attain good fireproofing of materials by a treatment dependably free of deteriorating effect upon said materials.

Broadly it is an object of the invention to produce improved fireproofing or fire-retarding effects by treatment of inflammable materials generally with a solution of the stated character. A more specific object of the invention is to treat cellulose ester materials or articles made therefrom, especially motion picture films, in this manner whereby the difficulties previously experienced with respect to decomposition of the film and consequent rendering of the same brittle may be avoided.

With these objects in view as well as others which will become apparent as the description of the invention proceeds, the invention comprises the novel processes, compositions and resultant treated articles which will first be described in connection with practical illustrative embodiments thereof and will then be more particularly pointed out in the claims.

In general, the objects of the present invention may be achieved by employing in a substantially non-aqueous solution of a fire-retarding metal salt, an organic compound capable of exerting an acid-binding action, either by direct neutralization of any free acid initially present or subsequently developed in the protective composition, or else by reaction with the fire-retarding metal salt with formation of a metallo-organic complex of some kind in the formation of which acid may be set free. In some cases, such organic compound may even be present in preponderating proportion and, either in and of itself or through association or combination with the metal of the salt, exert a large or even, major part of the fireproofing action. Materially better results can be obtained in this way. Moreover, the use of such antacid compounds has further pronounced advantages where the fireproofing treatment is applied to materials whose appearance or physical characteristics, such as transparency, it is vital to avoid altering. Unlike most inorganic substances available for neutralizing purposes, these organic compounds commonly yield, as a result of their neutralizing or antacid action, products which are compatible or miscible with the other ingredients present and do not tend to separate out with resultant clouding effect or the like. Compounds comprising a reactive nitrogen-hydrogen group, and in particular compounds comprising an amino ($NH_2$) group, have proved most suitable; and of these compounds urea has been found to have exceptionally desirable effects especially in the fireproofing of celluloid and similar materials. Anilin is another compound of the general type in question which may sometimes be used to advantage.

While the invention is of broad scope in its general application to the protective treatment of a wide variety of materials, the treatment of cellulose ester materials, such as celluloid, cellit, and articles manufactured therefrom, will be more particularly hereinafter described in detail by way of an illustrative example from which the underlying principles of the invention may be fully understood.

It will be assumed in this particular instance that a motion picture film is to be fireproofed. Such films are for the most part made of celluloid and therefore have a cellulose nitrate base. Such films are excessively inflammable. A small proportion of motion picture films is made of cellulose acetate which, although less inflammable, is nevertheless a relatively inflammable material. In applying the invention to the production of fire-resistant motion picture films, it is possible to proceed either by treating the cellulose ester composition before its manufacture into the form of a film, or to treat the film after it has been finished and pictures have been made therefrom. In either case, a suitable treating composition may be prepared in a typical instance as follows:

Antimony trichlorid, most desirably in the form of anhydrous crystals, is dissolved in ethyl acetate in the proportion of about 4 pounds of the antimony trichlorid to each gallon of ethyl acetate. When the antimony trichlorid is entirely dissolved, urea is added slowly while stirring, and this addition is continued until the solution will apparently take up no more urea. A substantial excess of the undissolved compound is added and, most desirably the mixture is allowed to stand for several days, say four or five days or more. Experience shows that in this way it is possible to obtain a treating solution having superior fireproofing effects. This is apparently not merely a question of obtaining a sufficient concentration of the ingredients in the solution but of allowing a reaction of some kind between them to go to substantial completion. Although urea is insoluble in ethyl acetate, it is dissolved by the solution of antimony trichlorid in ethyl acetate, which seems to be further evidence that a reaction occurs between urea and the antimony trichlorid. Furthermore, if the complete solution be brought into contact with water, a very bulky insoluble precipitate is formed which seems to be quite different from the antimony oxychlorid precipitate which is thrown out when water is added to a solution of antimony trichlorid alone in the same solvent.

The solution prepared as above described serves as a stock solution which should be diluted with more ethyl acetate before application to the film to be treated. Ordinarily a suitable treating solution can be prepared by mixing one volume of the stock solution with five volumes of ethyl acetate. Such a solution when properly applied, not only has an entirely satisfactory fireproofing effect on the film but the film itself dries rapidly after the treatment, which is an important factor in commercial work. The application of the solution to the film may be accomplished in various ways. Thus, the film may be immersed in the treating solution continuously for, say 15 to 60 seconds, the latter period being usually amply long to effect complete fireproofing. However, this method of application sometimes involves difficulty because of the tendency of the film to warp or "rock". A better procedure is to run the film through the solution in such manner that each portion is subjected to its action for say two or three seconds, and is then allowed to dry, these operations being repeated a number of times say eight or ten times. This not only avoids the warping tendency almost entirely but gives an increased fireproofing effect as compared to continuous immersion for the same total length of time. If desired, dyestuffs or coloring matter of any suitable character may be added to the solution to tint the film. When properly conducted, the foregoing treatment of the film has no adverse effect upon the photographic images that it may carry. In this connection care should be taken that the film is not immersed so long a time in the solution that the solvent action of the ethyl acetate is allowed to disintegrate or otherwise injure the film. Furthermore, it is feasible to add benzol or other suitable solvent to the bath to reduce the penetrating action of the ethyl acetate where for any reason it is desired to prolong the treating period to obtain increased fireproofing effect. The manipulation of the film in treating the same with the fire-retardant solution can of course be most conveniently effected mechanically with the aid of film-handling machinery the general character of which is well known to those skilled in the art of manufacturing and handling films. Also the solvent evaporated from the treated film can be recovered according to well known methods.

Motion picture films treated as hereinabove described, even those whose base is a highly inflammable cellulose ester, such as celluloid, may be rendered thoroughly fire-resistant. That is to say, when a piece of the film is held vertically and a lighted match is applied to the lower edge, the film does not inflame but merely chars. Any desired lesser degree of fireproofing than this is obtainable by shortening the time of immersion in the treating bath or by using weaker baths. In the case of motion picture films, however, it is usually desired to obtain substantially complete non-inflammability. It is characteristic of films treated in accordance with the invention that they do not become brittle even after long periods or time, but retain their flexibility and toughness substantially unimpaired.

Not only does the urea act as a neutralizing or antacid, agent, but it also contributes a large proportion of the fireproofing effect obtained. In the particular example above given, the quantity of antimony trichlorid in the diluted stock solution amounts to approximately 2.5 grams of antimony trichlorid per fluid ounce of solvent. This amount of antimony trichlorid alone, without the urea, would be quite insufficient to produce adequate fireproofing of the film, but the combination or composition of these two ingredients renders the film thoroughly non-inflammable. It is probable, as hereinbefore indicated, that the metal salt and the urea react to form a complex compound which has pronounced fire-retardant properties and is water-insoluble.

The invention is also of great utility in the fireproofing of artificial silk (rayon), and fabrics made therefrom. These materials, as well as motion picture films, can be treated with the described fireproofing composition without undergoing any perceptible change in appearance and yet are rendered flame-proof where the treatment is carried to completion. Another useful field is in the manufacture of non-inflammable cellulose ester insulating lacquers or varnishes, the use of which is insulating electrical windings or the like has heretofore been limited owing to the inflammable character of such lacquers.

For fireproofing canvas, duck, brattice cloth for mines, cloth for airplane wings, balloon envelopes, and the like, the present invention has also great utility. Canvas, for example, treated in the manner described retains its flexibility and surface appearance practically unaltered and yet at the same time is rendered thoroughly fire-resistant. Furthermore, the fireproofing agent appears to be fixed upon and throughout the fibers more permanently than was possible heretofore when using the non-aqueous solutions of fire-retardant metal salts described in the prior patents hereinbefore mentioned.

It is believed to be broadly new to employ urea in water-insoluble association or combination with a metal or metal compound for fireproofing inflammable material. Therefore, although the particular agent associated with the urea to render the same insoluble comprises antimony, it is to be understood that the invention is not limited thereto but extends to the use of other water-insoluble metal compounds of urea.

In the foregoing discussion reference has been made more particularly to the use of antimony trichlorid as a fire-retarding metal salt. Other salts of antimony, such as the sulfate, may be used, as may also salts of other metals of the antimony group. Antimony trichlorid, especially in the anhydrous crystal form, possesses certain very distinct advantages over these other salts, however, and its use is recommended as most advantageous. Instead of ethyl acetate (acetic ether) other substantially non-aqueous solvents may be employed such as amyl acetate, amyl alcohol, acetone, or ether-alcohol mixtures. Any of the foregoing solvents possesses the power to penetrate celluloid or similar cellulose ester plastics and are also of general applicability in the fireproofing treatment of other materials generally in accordance with the principles of the invention. Composite solvents, comprising any two or more of the above solvents which may be compatible or miscible under the conditions of use described, may be employed if desired.

What is claimed is:

1. The process of protectively treating material which comprises applying thereto a solution resulting from commixture of an acid-yielding fire-retardant metal salt and an acid-binding organic compound which does not promote inflammability, together with a substantially non-aqueous solvent capable of dissolving the associated salt and compound.

2. The process of protectively treating material which comprises applying thereto a solution resulting from commixture of a hydrolyzable fire-retardant metal salt and an acid-binding organic compound which does not promote inflammability, together with a substantially non-aqueous solvent capable of dissolving the associated salt and compound.

3. The process of protectively treating material which comprises applying thereto a solution resulting from commixture of an antimony group metal salt and an acid-binding organic compound which does not promote inflammability, together with a substantially non-aqueous solvent capable of dissolving the associated salt and compound.

4. The process of protectively treating material which comprises applying thereto a solution resulting from commixture of antimony trichlorid and an acid-binding organic compound which does not promote inflammability, together with a substantially non-aqueous solvent capable of dissolving the associated salt and compound.

5. The process defined in claim 1 further characterized by the fact that said acid-binding compound comprises a reactive nitrogen-hydrogen group.

6. The process defined in claim 1 further characterized by the fact that said acid-binding compound comprises an amino ($NH_2$) group.

7. The process of protectively treating material which comprises applying thereto a solution resulting from commixture of a hydrolyzable fire-retardant metal salt and a fire-retardant amino compound capable of reacting therewith, together with a substantially non-aqueous solvent capable of dissolving the associated salt and compound.

8. The process of protectively treating material which comprises applying thereto a solution resulting from commixture of antimony trichlorid and a fire-retardant amino compound capable of reacting therewith, together with a substantially non-aqueous solvent capable of dissolving the associated salt and compound.

9. The process of reducing the inflammability of material comprising a cellulose ester, which comprises subjecting such material to the action of a solution resulting from commixture of a substantially water-insoluble fire-retardant metal salt and an acid-binding fire-retardant organic compound with a substantially non-aqueous solvent capable of dissolving the associated salt and compound and having penetrative action upon such cellulose ester material.

10. In the preparation of fire-resistant articles composed of material comprising an inflammable cellulose plastic, the process which comprises treating the material with a substantially non-aqueous solution containing urea in water-insoluble form.

11. In the preparation of fire-resistant articles composed of material comprising an inflammable cellulose plastic, the process which comprises treating the material with a substantially non-aqueous solution containing urea in water-insoluble association with a metal of the antimony group.

12. In the preparation of fire-resistant articles composed of material comprising an inflammable cellulose plastic, the process which comprises treating the material with a substantially non-aqueous solution containing urea in water-insoluble association with antimony.

13. In the preparation of fire-resistant articles composed of material comprising an inflammable cellulose plastic, the process which comprises treating the material with a substantially non-aqueous solution resulting from association of urea with antimony trichlorid in a volatile organic solvent.

14. The process of rendering a motion picture film fire-resistant which comprises applying to such film a solution comprising a fire-retardant amino compound associated with a metal salt in a substantially non-aqueous volatile solvent.

15. The process of rendering a motion picture film fire-resistant which comprises applying to such film a solution comprising urea associated with an antimony group metal salt in a volatile solvent having the power to penetrate into the film base.

16. The process of rendering a motion picture film fire-resistant which comprises applying to such film a substantially non-aqueous solution of urea in water-insoluble form.

17. The process of rendering a motion picture film fire-resistant which comprises applying to such film a substantially non-aqueous solution of urea and antimony trichlorid in a volatile solvent by which the film base is penetrable.

18. The process of rendering a motion picture film fire-resistant which comprises applying to such film a substantially non-aqueous solution of urea and antimony trichlorid in ethyl acetate.

19. As a new article of manufacture, normally inflammable material carrying urea in water-insoluble form and in quantity sufficient to render said material fire-resistant.

20. As a new article of manufacture, normally inflammable material carrying a fire-retarding agent resulting from association of a metal salt with a fire-retardant amino compound capable of reacting therewith to form a substantially water-insoluble product.

21. As a new article of manufacture, normally inflammable material carrying a substantially water-insoluble fire-retarding agent resulting from association of a metal salt with urea.

22. As a new article of manufacture, normally inflammable material carrying a fire-retarding agent resulting from association of antimony trichlorid with urea.

23. As a new article of manufacture, a normally inflammable material having a cellulose base carrying urea in water-insoluble form and in sufficint quantity to render said material fire-resistant.

24. As a new article of manufacture, a normally inflammable material having a cellulose ester base carrying urea in water-insoluble form and in sufficient quantity to render said material fire-resistant.

25. As a new article of manufacture, a normally inflammable material having a cellulose base carrying a composition of an amino compound and a fire-retardant metal salt in sufficient quantity to render said material fire-resistant.

26. As a new article of manufacture, fire-resistant celluloid carrying a composition of urea and antimony trichlorid.

27. As a new article of manufacture, a fire-resistant motion picture film carrying a protective quantity of urea associated with a fire-retardant metal salt.

28. As a new article of manufacture, a fire-resistant motion picture film carrying a protective quantity of urea associated with antimony trichlorid.

In testimony whereof I hereunto affix my signature.

ARTHUR ARENT.